Nov. 11, 1969  V. D. MOLITOR  3,478,193
FOOD SERVICE CARTS

Original Filed Feb. 7, 1966  3 Sheets-Sheet 1

INVENTOR.
VICTOR D. MOLITOR
BY
Van Valkenburgh & Lowe
ATTORNEYS

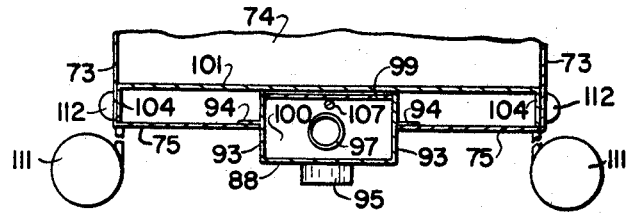
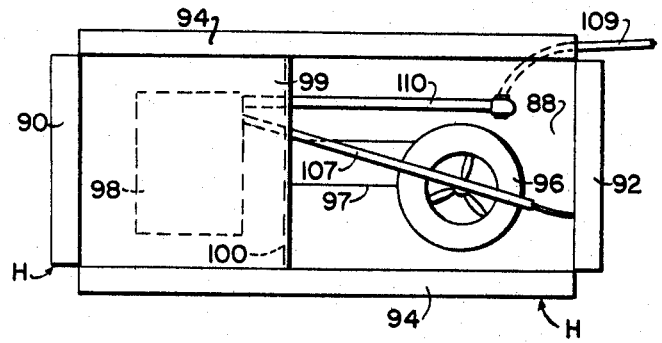
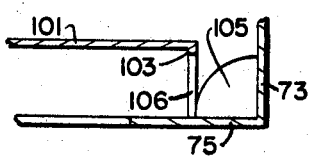
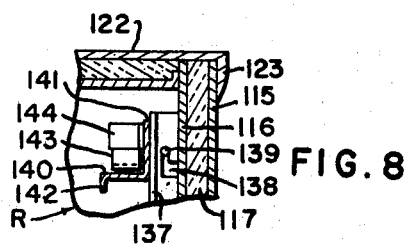

Nov. 11, 1969 V. D. MOLITOR 3,478,193
FOOD SERVICE CARTS
Original Filed Feb. 7, 1966 3 Sheets-Sheet 3

INVENTOR.
VICTOR D. MOLITOR
BY
Van Valkenburgh & Lowe
ATTORNEYS

United States Patent Office 3,478,193
Patented Nov. 11, 1969

3,478,193
FOOD SERVICE CARTS
Victor D. Molitor, 2829 S. Santa Fe Drive,
Englewood, Colo. 80110
Original application Feb. 7, 1966, Ser. No. 533,114, now Patent No. 3,340,380, dated Sept. 5, 1967. Divided and this application July 17, 1967, Ser. No. 653,960
Int. Cl. F27d 1/18; F24d 5/04
U.S. Cl. 219—386     3 Claims

ABSTRACT OF THE DISCLOSURE

Food service carts useful in a food service system for serving a large group of people, such as at a banquet. One cart is a hot storage cart having a panel pivoted to the top of the side wall to form a door, and provided with an outwardly curved flange at the upper edge, with a pair of hinged top panels, one of which has a curved flange for engaging the outwardly curved flange of the door, to hold the door in closed position. Another cart is a hot food storage cart having racks for receiving the edges of pans of heated foods, with clips for holding the pans in position on the racks and the racks being attached to a panel spaced inside the adjacent wall and holes in the panel for circulating heated air across and between the pans. Each of the carts has a false bottom mounted over a heater unit and having opposite edges spaced from opposite walls, with a partition dividing the space below the false bottom into a blower area and a heater area. An electrically driven motor is mounted in the lower area and has its outlet in the partition, while an elongated electric heating element is mounted in the heater portion, so that air drawn from within the cart at one edge of the false bottom wall be moved by the blower along the heating element for discharge of the heated air at the opposite edge of the false bottom.

---

This application is a division of my copending application Ser. No. 533,114 filed Feb. 7, 1966, now U.S. Patent No. 3,340,380, in turn a division of my application Ser. No. 108,622, filed May 8, 1961 (now abandoned). This invention relates to service carts adapted for use in a food service system for serving large groups of people, such as at a banquet.

Previous to the present invention, it was necessary to prepare food hours in advance, storing the hot foods on or in a steam table and the cold foods in a refrigerator. Often, it was necessary to place the food on plates long before it was to be served, and then immediately before serving freshen the plates with a garnish, but foods prepared and stored in this manner exchange tastes with each other, lose color, and lose their own taste. Thus, the industry has found that this system is not entirely satisfactory, since food handling cost is increased, labor cost is increased, and the patrons generally are not satisfied with the quality of the meal. Also, if a large group is to be served, considerable time is expended in serving the entire group, so that the food of the patrons first served becomes cold before the last patron can be served. The speed of service has been a serious problem as well as the time consumed in clearing the dishes after the meal and serving dessert, for instance. Also, it is often necessary to transport the food a considerable distance from the kitchen to the banquet area, particularly when the kitchen is located on a different floor than the banquet area. Thus, it has been observed that it is nearly impossible to serve a hot, tasty plate of food under such circumstances.

Among the objects of this invention are to provide novel service carts; to provide such service carts adapted to be utilized with an assembly station for a food service system, as for banquets and the like; to provide such carts for a system in which mass production methods may be employed; to provide such carts by which the food may be served in as fresh and tasty condition as though it had been served directly from the stove, and by which a remote assembly area which may be of minimum size may be utilized; to provide a novel hot storage cart in which filled plates may be placed at an assembly station, each filled plate being conveniently provided with a cover; to provide such hot storage carts which are heated but are readily cleaned; to provide such a hot food storage cart in which a plurality of stacks of plates and covers are supported; to provide a hot food cart in which heated food may be placed for use in replenishing the supply of food at an assembly station; to provide such a hot food storage cart wherein each tray of food is maintained at the same temperature; to provide such a hot food cart wherein certain parts are readily removable for cleaning; to provide such a hot food storage cart in which the reception of trays of food is facilitated and lids are held tightly on the trays during transportation; and to provide such hot food storage carts having features which may be utilized in other types of carts.

Additional objects and the novel features of this invention will become apparent from the description which follows, taken in conjunction with the accompanying drawings, in which:

FIG. 3 is a fragmentary vertical section taken along line 3—3 of FIG. 2 and showing particularly a blower duct for the heater;

FIG. 4 is a slightly enlarged, top plan view of the heating unit for the storage cart of FIG. 2;

FIG. 5 is an enlarged, fragmentary vertical section corresponding to a lower corner of FIG. 2 and showing particularly the manner in which spacing ears engage a false bottom of the cart;

FIG. 8 is an enlarged, fragmentary vertical section, taken along line 8—8 of FIG. 7 and showing particularly a locking pin which holds a side panel in place in the cart of FIG. 6.

Figure 1:
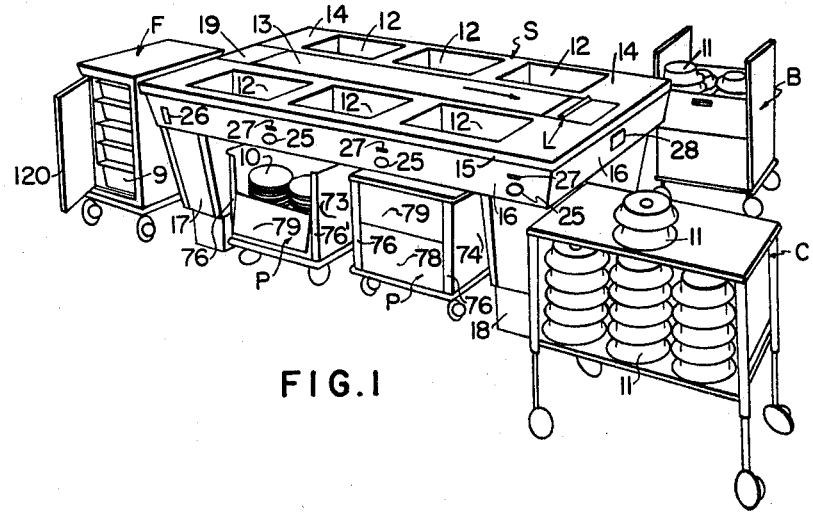
FIG. 1 is a perspective view of an assembly station and hot food cart of this invention, forming parts of a food service system.

The food assembly station S shown in FIG. 1 is conveniently located near the center of a suitable room, such as a banquet assembly pantry, adjacent the banquet service area when the kitchen is located some distance from the banquet service area. The food is transferred from the kitchen in deep trays 9, placed in a hot food cart, F, which is positioned adjacent the food assembly station and the heating unit thereof conveniently plugged into an electrical outlet on the assembly station. The plates 10, as well as plate covers 11, if desired, are stored in plate service carts P, which may be rolled under the assembly station, as shown, and the heating units plugged into electrical outlets at the assembly station to keep the plates and plate covers warm. If a cold plate is to be served, the plates may be stored on and/or moved to the dining area by a bus cart C, the specific construction of which forms no part of the present invention.

Figure 2:
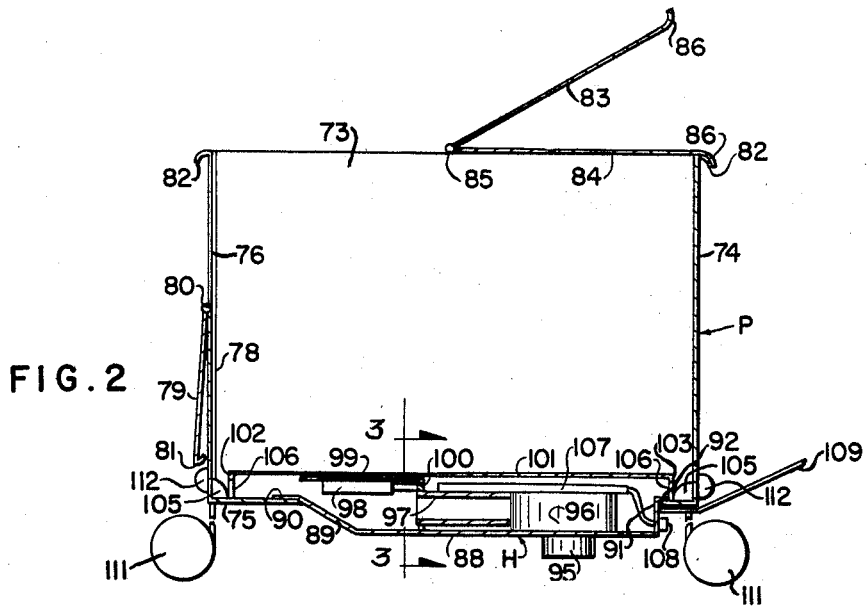
FIG. 2 is a central, longitudinal vertical section of a hot storage cart, shown also in FIG. 1.

At the assembly station S, the pans 9 containing the various foods are placed in heated wells 12, from which the food is placed on the plates as they travel along a belt 13, which moves in the direction of the arrows of FIGS. 1 and 2. The plates are preferably placed on the belt 13 at one end and removed from the opposite end, the belt travelling relatively slowly, such as at a speed of 15 feet per minute, and the belt also being sufficiently wide that two plates may be placed side by side on the belt, with the plates on one side being served from the wells 12 on that side and the plates on the opposite sides of the belt being served from the opposite wells. The person at the first well 12 on each side conveniently removes a stack of plates from plate cart P and places the stack at the end of the station. This same person places each plate, in turn, on the belt, after placing a serving of food from the first well thereon. The food at the first well is conveniently meat or other solid food, which does not require dipping, ladling, etc., to permit this person additional time for handling the plates. While three wells 12 are shown on each side of the assembly station S, in the event that more than three different foods are to be placed on each plate, two receptacles, each with a different food therein, may be substituted at one or more well positions. As will be evident, with one person standing at which well 12 and placing the same food on each plate, the operation may be carried out at maximum speed. Thus, 48 plates per minute, or 720 plates in a fifteen minute period have been filled at such an assembly station. As the filled plates reach the end of belt travel, they are removed, conveniently by one or two persons who place garnish on the plate, then a cover 11 and places the same in a banquet service cart B, two of which may be provided when the assembly station is operating at maximum capacity. A limit switch assembly L is located at the end of the belt travel, to stop the conveyor should any plate not be removed by the worker stationed there, thereby preventing filled plates from being pushed off onto the floor.

When a banquet service cart B, disclosed in greater detail in my application Ser. No. 533,114, has been filled, it is closed and moved directly to the banquet area, the heating unit thereof being unplugged from the assembly station upon such movement. The heating unit may be replugged into an electrical outlet when the banquet area is reached, if the food is not to be served immediately, thus maintaining the food piping hot at all times. The banquet service carts B preferably have a reasonable capacity, such as 60 plates and covers, but without being unwieldy in size. Thus, a sufficient number of banquet carts B should be on hand, so that a filled cart can be immediately replaced with an empty cart, whose heating unit can be plugged into an electrical outlet at the assembly station A. Also, when the assembly station is being operated at capacity, a banquet service cart B will be substituted for the bus cart C shown in FIG. 1, so that two banquet service carts can be filled simultaneously. If a large group is to be served, the dishing of the plates may be begun some time before the starting time for the banquet and the filled plates stored in banquet service carts B, as described. If a smaller group is to be served, the filled plates with covers 11 can be stacked in the bus cart C, as shown, which when full can be immediately wheeled to the banquet area.

The deep trays 9, shown as stored in the hot food cart F and previously filled in the kitchen, are removed from cart F and placed in the wells 12 when the plate filling operation is begun. Of course, several hot food carts F will be in use, to permit empty trays 9 in wells 12 to be replaced by full trays and a cart F returned to the kitchen for more food. The waiters or waiter's helpers, from the banquet area, may be utilized to move banquet service carts B to and from the dining area, while additional employees may be necessary to move the hot food carts F to and from the kitchen area. As will be evident, the chef and cooks need not leave the kitchen area and need only fill pans 9 with hot food. The pans 9 fit into the wells 12 or, as indicated previously, two or more pans 9 may fit into one well 12, as when more than three food items are placed on one plate.

The top 14 of assembly station A is preferably made of heavy gage stainless steel, with all edges rolled down to form flanges 15 and highlighted to a mirror finish. The flanges 15 lap over side skirts 16, while the top is supported by a pair of spaced pylons 17 and 18, which may be decorated with black Formica or other suitable material and trimmed with stainless steel. The upper run of the endless conveyor belt 13 moves longitudinally along the center of the table top, being slotted at the entrance end and the slot covered by a plate 19 which is conveniently welded thereto and raised to form a slot sufficient in size to accommodate passage of the belt. The three wells 12 on either side of the belt may be provided with a conventional heater (not shown) regulated by an adjustable thermostatic conrol 25, mounted at a convenient position in skirt 16 to permit regulation of the temperature of the food contained in the pan or pans in each well. A master switch 26 is located at one end of assembly station A, to turn off all the well heating units after the plates have been dished, while a lamp 27 is conveniently positioned adjacent each heater control 25, for convenience in indicating which heating units are on. A double electrical outlet 28 is conveniently positioned in skirt 16 at each end of the assembly station for convenience in plugging in the heaters of two banquet service carts B or two plate carts P.

The plate service carts P, shown in greater detail in FIGS. 2–5, are utilized for storing plates 10 and particularly for preheating the plates and maintaining them warm, as indicated previously. Such carts are desirably made of heavy gage stainless steel, each having side walls 73 connected by a rear wall 74 and a bottom 75 having a central opening for receiving a heater unit H, to be described. The side walls 73 terminate in inturned flanges 76 and 76', shown in FIGS. 1 and 3, which provide a portion of the front wall. The remainder of the front wall consists of a fixed lower panel 78 and a movable upper panel 79 pivoted to the upper edge of the lower panel 78, as by a hinge 80, and provided with an upper curved lip 81. The peripheral edges of the side and rear walls each have an out-turned flange 82, at the top thereof, similar to lip 81 of upper panel 79. A removable top is provided for the cart and includes a front panel 83 and rear panel 84 which are pivoted together at the center by a hinge 85. Each panel 83 and 84 has a curved lip 86 around three sides which engage flange 82 of the side and rear walls to hold the top in position, particularly when closed, while lip 86 of front panel 83 also engages lip 81 of the upper front panel 79, when the latter is in raised position, to hold the front panel up so that the cart will be completely closed to assist in keeping the plates or covers, which are stored therein, warm. As in FIG. 2, the top front panel 83 may be raised and pivoted rearwardly onto the top rear panel 84, being shown as only partly back to full open position in FIG. 2 for clarity of illustration, thus releasing the upper edge of movable front panel 79, which may be pivoted downwardly to the position of FIG. 2, as shown also for one cart P in FIG. 1, to provide access to the plates or covers stored therein. When placing plates or covers in a cart P, top panel 83 may be pivoted over onto panel 84 to provide access to one half of the cart, then the top panels reversed to provide access to the other half, or, the top may be removed entirely and then replaced after the plates have been placed therein. After the cart is full, the movable front panel 79 is lifted up and lip 86 of top panel 87 placed thereon to maintain front panel 79 in place, as in the case of the other cart P of FIG. 1.

A thermostatically controlled heater unit H is supported by bottom 75 of the cart and extends downwardly through a central opening therein, as in FIGS. 2 and 3. The heating unit includes a bottom 88 terminating at its forward end in an upwardly and forwardly extending portion 89, having a forwardly extending flange 90 resting on bottom 75, and at its rear end in an upturned rear wall 91 having a rearwardly extending flange 92, also resting on bottom 75. The heater unit also has side walls 93 having laterally extending flanges 94 at their upper edges, which also rest on bottom 75 of the cart. The rear wall 91 and side walls 93 engage the edge of the opening in bottom 75 of the cart to hold heating unit H in position. As also evident, from FIG. 4, the portion 89, rear wall 91 and side walls 93 are conveniently integral with bottom 88, being connected together at the corners, as by welding or lapped and riveted joints, while flanges 90, 92 and 94 are also conveniently integral with the remainder of the housing. A motor 95 is mounted on the underside of housing bottom 88, as shown, for driving a blower 96 mounted thereabove. Air is pulled into the blower from an inlet at the center of the top thereof and the blower outlet is connected to a duct 97 which extends forwardly toward an electrical heating unit 98 mounted on the underside of a plate 99 having a rear flange 100, the plate and flange being connected between side walls 93 of the heater housing and duct 97 being attached to flange 100 at an appropriate hole therein. A false bottom 101 fits down over the heater unit and has depending end flanges 102 and 103, respectively, and depending side flanges 104, the end and side flanges resting on bottom 75 of the cart to maintain the false bottom in spaced position above the heater unit H. To provide spaces between the end walls of the cart and the ends of the false bottom, end flanges 102 and 103 engage ears 105 which are mounted in the front and rear corners of the cart, as shown in FIGS. 2 and 3, while side flanges 104 merely abut side walls 73 of the cart, as in FIG. 4. Both front and rear flanges 102 and 103 have slots 106 therein, the slot in the rear flange 103 forming an intake opening for air to pass to blower 96 and the slot in front flange 102 forming a discharge opening through which heated air is discharged by the blower. This air passes up through the plates and/or covers stored in the cart and returns to the blower, so that generally the same air is recirculated and the amount of electricity needed for maintaining the air at a desired temperature is reduced. Also, the temperature throughout the cart will tend to be substantially uniform. A thermostat 107 extends across the intake of blower 96, as in FIGS. 2 and 4, and is adjusted to maintain the temperature of the articles within the cart by a control 108, mounted on rear wall 91, as in FIG. 2. Heater 98 is connected to a source of electricity through a cord 109, connected to the heater by wires installed in a conduit 110, as in FIG. 4. Advantageously, the cart is provided with rubber tired casters 111 at the four corners, so that it may easily be moved from place to place. A rubber or plastic bumper 112 advantageously extends around the lower periphery of the cart to prevent damage, should the cart be pushed against another article.

As can be seen, the plate storage cart P may be used to store plates and covers which are loaded in the kitchen or dishwashing area and the cart then wheeled to the assembly station and the heater and blower plugged into a socket to keep the plates and/or covers warm until they are ready to be used. Immediately prior to use, the plates and covers may be removed from the storage cart and the food placed thereon.

Figure 6:
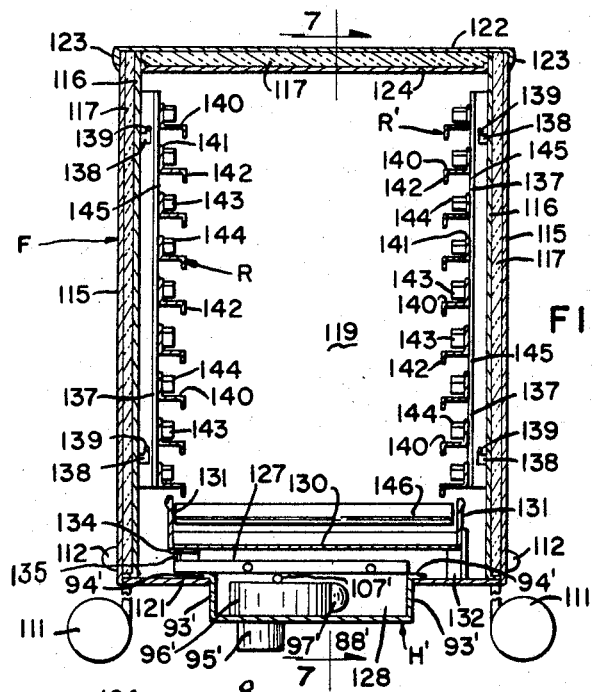
FIG. 6 is a central, lateral vertical section of a hot food cart shown in FIG. 1, illustrating particularly pan guides and a heater thereof.
Figure 7:
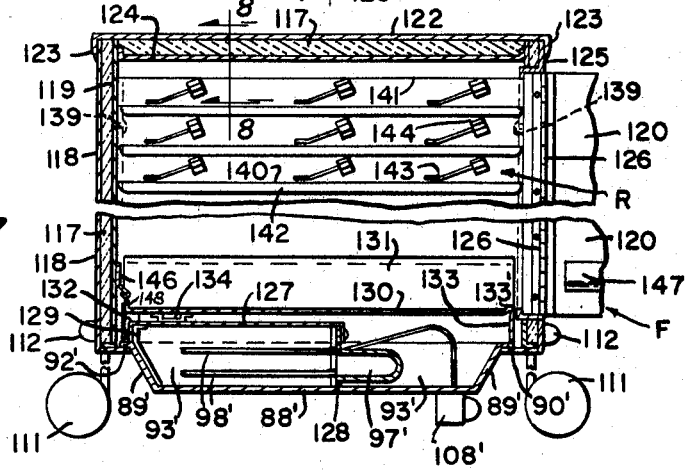
FIG. 7 is a condensed vertical section, taken along line 7—7 of FIG. 6 and showing particularly the pan clips for holding lids on food pans and additional details of the heater.

Details of the construction of the hot food cart F are shown in FIGS. 6–8. The hot food cart F is conveniently provided with spaced outer and inner side walls 115 and 116, with insulation 117 therebetween, as in FIG. 6, and spaced outer and inner rear walls 118 and 119, respectively, as in FIG. 7, again having insulation 117 therebetween. The cart also has an insulated front door 120, shown in FIG. 1, which is hinged at one side, as well as a bottom 121 and a top 122 with a downturned peripheral flange 123 engaging the outer walls. Insulation 117 is provided under top 122 and is held in place by a panel 124 having upturned peripheral flanges welded to the side and rear walls, and also to the top of a door frame 125, which forms the remainder of the front of the cart, along with the sides curving around to the front. The door 120 is provided with spaced outer and inner walls with insulation therebetween and is mounted on a hinge 126, as in FIG. 5. The inner and outer rear and side walls, door walls, bottom, top and top panel are conveniently made of stainless steel, so that the cart may be easily cleaned to meet sanitary requirements. Cart F is also provided with upper rubber tired casters 111 at each of the four lower corners and a bumper 112 of resilient material.

A heater unit H', similar in certain respects to heater unit H of plate storage cart P, is received in an opening in bottom 121. Thus, heater unit H' includes a housing fitting into a rectangular slot in bottom 121 and having a bottom 88', upwardly sloping front and rear portions 89' and side walls 93' which, together with flanges 90', 92' and 94', are similar to the corresponding parts of the heater unit H of cart P. Similarly, motor 95', a blower 96' and duct correspond to parts of heating unit H. As before, a thermostat 107' overlies the intake of blower 96' and is provided with a control 108'. The heater may consist of several rod-like heating units 98' extending into a heating space formed by the rear portion of bottom 88', and side walls 93', rear sloping wall 89', and a top plate 127 from the front edge of which a central wall 128 depends and from the rear edge of which a rear wall 129 depends. Heating units 98' are conveniently mounted on central wall 128, to which duct 97' extends, as in FIG. 7. At one side, the heating space is open, between cart bottom 121 and plate 127, to form an opening for discharge of heated air, but is closed at the opposite side by the upward extension of side wall 93' to plate 127, as in FIG. 7. Forwardly of plate 127, the heater unit housing is open at the top, to permit air to be drawn into the inlet of blower 96'. A false bottom 130 extends over the heater unit, being formed with upturned side flanges 131 and supported by angular corner posts 132 spot welded to the side flanges at the corners, on the intake side, a front flange 133, having an inverted angular configuration 133' at the upper edge, as in FIG. 7, and a support 134 resting on heater unit plate 127. A depending side flange 135 is provided with a slot corresponding to the shape of plate 127 and walls 128 and 129, thereby fitting over the plate and closing the outlet side of the heating unit, except for the discharge opening beneath plate 127. Thus, the heated air is blown upwardly at one side and behind a side rack R, to be described, then between the trays of food, then behind the opposite side rack R' for return to the heating unit.

Side racks R and R' each include front and rear side angles 137, each provided in the side leg with vertically spaced bayonet slots 138 which engage pins 139 extending inwardly from the front and rear walls, as in FIGS. 6 and 8. Thus, each rack is placed with the lower ends of the bayonet slots 138 engaging pins 139, then moved toward the respective side wall until it contacts the side wall and then dropped downwardly until the pins engage the upper ends of the bayonet slots. The side flanges space the racks from the walls and permit air to circulate behind the side walls and the racks. In each rack, a plurality of vertically spaced pan supporting guides 140 having upstanding, rear flanges 141, extend between the angles 137, the rear flanges 141 being spot welded to the front legs of the angles 137. Each pan guide 140 terminates at the front edge in a downturned flange 142, which centers the pans between the racks and also force any food which might spill out of a pan to drip downwardly onto the edge of the next pan, rather than behind the side racks. Spilled food will thus be forced to the front or rear of the pans for collection in the false bottom 130, as described later. Leaf spring clips 143 are located above the respective guides 140 and are adapted to bear against the lids on the pans to minimize the tendency for food to splash or run over the sides and down onto a lower pan. It has been found satisfactory to use three of these clips, spaced longitudinally above each of guides 140. Each of the spring clips 143 is attached, as by spot welding, to one leg of an angle 144, the opposite leg of which is attached, as by spot welding, to the rear flange 141 of the respective pan guide. The racks R and R' are similar in construction, but the spring clips 143 of each extend rearwardly, when in position in the cart, to facilitate inserting a food pan with a lid between the opposite pan guides 140 and beneath the spring clips 143. Thus, the spring clips 143 of racks R and R' face in opposite directions.

As will be evident from FIG. 6, a slot 145 will be formed between the upper edge of a pan guide and the next pan guide above. Thus, heated air which is blown upwardly behind rack R will pass through openings 145 and above and beneath each tray of food to maintain it at a constant hot temperature, the front flanges 142 of the pan guides also tending to deflect heated air onto the pan covers. After passage between the food pans, the air will pass through slots 145 in rack R' and down behind the rack and thus return to the heater unit H'. In this manner, each of the pans may be maintained at a constant uniform temperature and this temperature may be substantially the temperature of the food as it is removed from the stove in the kitchen. Thus, in the kitchen the food may be placed in the pans, the pans then slid onto guides 140 and door 120 closed. The cart is then wheeled to assembly station A, where it is plugged in, so that the heater and blower will maintain the food at the desired temperature until it is ready to be used. At this time, the door is opened and the trays are taken out, as needed, and placed in the wells in the food assembly station, to be dished as the plates move along the conveyor belt, as described above. In this way, a very tasty plate of food can be served and the quality thereof will be substatnially the same as that obtained in the home where food is dished directly off the stove and onto the plates, to be eaten immediately.

In the event that food should be accidentally spilled from any of the pans, particularly during placement of the pans in the cart, as indicated previously, flanges 142 will cause the food to drop down at the inside of the racks, as to the next pan below or onto false bottom 130, it being noted that the flanges 142 are located inwardly of the side flanges 131 of the false bottom. Spilled food which does not remain on a pan cover will normally run to the front or rear edge of the pan cover and will drop downwardly adjacent rear wall 119 or door 120. An angle 146 having a downwardly extending lower leg will deflect such food falling adjacent the rear wall onto the false bottom, while a similar angle 147 will deflect food falling adjacent the door 120. Angle 146 is conveniently mounted on inner rear wall 119, as by spot welding or rivets, while angle 147 is similarly mounted on the inside of door 120. Angle 146 further acts to center the false bottom, being disposed between the flanges 131 thereof, as in FIG. 6. False bottom 130 is also conveniently constructed to collect any food spilled therein, since it is more readily cleaned than the parts beneath, including the heating unit. The inverted angular configuration 133' at the front, the side flanges 131 and a rear flange 148, disposed beneath angle 146, as in FIG. 7, cause spilled food to be retained on the false bottom until it can be cleaned. For sanitary purposes, the parts of the false bottom and as many parts of the heating unit as possible are preferably formed of stainless steel.

From the foregoing, it will be apparent that a food service cart constructed in accordance with this invention fulfills to a marked degree the requirements and objects hereinbefore set forth. Each of the food service carts may have a thermostatically controlled heating unit, which is mounted in the bottom thereof and has a motor connected to a blower which blows air past an electrical heater and through a passage provided by a false bottom placed over the heater unit, so that the air is circulated through the cart and is returned through another passage at the opposite side or end of the false bottom. All of the carts are readily cleaned and maintained in a sanitary condition, since all of the interior parts are removable without removing any screws, bolts or the like. As will be evident, numerous features of both the hot food cart F and the hot storage cart P may be utilized in cold food carts or other types of carts.

Although a preferred embodiment of this invention has been illustrated and described, it will be understood that other embodiments may exist and various changes and variations may be made without departing from the spirit and scope of this invention.

What is claimed is:
1. A food service cart comprising:
   a rectangular body having a bottom and sides;
   supporting means for said body;
   heating means in said body;
   a panel pivoted at an intermediate position of one of said side walls and forming a door, said panel being provided with an outwardly curved flange at the upper edge thereof;
   a top including a pair of hinged panels extending across said cart, one of said panels having a curved flange adapted to engage said outwardly curved flange of said door to hold said door in closed position; and
   said side wall panel and said one top panel, when open, permitting dishes and the like to be placed in or removed from said cart at either the top or said side and said side wall panel, when open, with said one top panel closed, permitting dishes and the like to be placed in or removed from said cart at said side.
2. A food service cart, comprising:
   a rectangular body having a bottom, front, back, sides and top;
   a door in the front of said body;
   a heater unit mounted in the bottom of said cart;
   a false bottom mounted over said heater unit;
   openings provided by said false bottom adjacent said sides to permit circulation of air through said body and to and from said heater unit;
   a pair of side racks having means for receiving vertically spaced pans of food and openings for permitting heated air to circulate between said pans, said side racks providing a vertical space at each side for movement of heated air from said heater unit upwardly in said space at one side, then across and between said racks and the movement of air downwardly in said space at the opposite side and thence to said heater unit; and
   fastening means for removably mounting said side racks on the opposite side walls of said cart.
3. A food service cart comprising:
   a rectangular body having a bottom, sides and top;
   a door in said body;
   a heater unit mounted in the bottom of said cart;
   a false bottom mounted over said heater unit;
   openings provided by said false bottom to permit circulation of air through said body and to and from said heater unit;
   a pair of side racks having a plurality of vertically spaced guides for receiving pans of food and openings for permitting heated air to circulate between said pans;

a plurality of clips on said guides for holding lids on said pans; and fastening means for removably mounting said side racks on opposite inner walls of said cart.

References Cited

UNITED STATES PATENTS

| | | | |
|---|---|---|---|
| 2,447,787 | 8/1948 | Atkinson | 220—29 X |
| 2,790,888 | 4/1957 | Hoffmann. | |
| 2,809,766 | 10/1957 | Anderson | 220—29 X |
| 3,291,546 | 12/1966 | Traycoff | 312—236 X |

BERNARD A. GILHEANY, Primary Examiner

R. N. ENVALL, Jr., Assistant Examiner

U.S. Cl. X.R.

126—268; 296—22; 312—236